United States Patent [19]
Sisk

[11] Patent Number: 4,889,318
[45] Date of Patent: Dec. 26, 1989

[54] MOLDED HOPPER TEE

[76] Inventor: David E. Sisk, R.R. #1, Box 340, Bonne Terre, Mo. 63628

[21] Appl. No.: 279,718

[22] Filed: Dec. 5, 1988

Related U.S. Application Data

[63] Continuation-in-part of Ser. No. 186,104, Apr. 25, 1988, Pat. No. 4,848,396, which is a continuation-in-part of Ser. No. 817,584, Jan. 10, 1986, Pat. No. D. 297,678.

[51] Int. Cl.$^4$ .............................................. F16K 51/00
[52] U.S. Cl. .................................... 251/356; 285/156; 285/423
[58] Field of Search ................ 251/356, 143; 285/423, 285/405, 156

[56] References Cited
U.S. PATENT DOCUMENTS

| | | | |
|---|---|---|---|
| 1,860,346 | 5/1932 | Anderson | 285/156 |
| 3,039,795 | 6/1962 | Reuter | 285/423 |
| 4,047,741 | 9/1977 | Pertriaux | 285/156 |
| 4,506,918 | 3/1985 | Friedrich et al. | 285/423 |
| 4,648,628 | 3/1987 | Meadows et al. | 285/156 |

Primary Examiner—A. Michael Chambers
Attorney, Agent, or Firm—Paul M. Denk

[57] ABSTRACT

A molded hopper tee for a hopper truck, tank trailer or the like is disclosed as having a first generally vertically directed hollow pipe section including a laterally outwardly directed flange at an upper end thereof for attachment to the bottom of a hopper and a second hollow pipe section extending generally transversely to the first hollow pipe section and extending beyond the first hollow pipe section on opposite sides thereof and terminating in opposite free ends for attachment to pipeline tubing at a discharge location. Bulk granular material particles can be pneumatically unloaded from the hopper and routed first through the vertically and horizontally directed hollow pipe sections, and then into the pipeline tubing. Opposite free ends of the second hollow pipe section include at least one circumferentially extending metal reinforcing element molded in-situ within and adjacent each free end. The laterally outwardly directed flange at the upper end of the first hollow pipe section also includes at least one metal reinforcing element molded in-situ so as to extend in the same direction as the laterally outwardly directed flange.

5 Claims, 2 Drawing Sheets

MOLDED HOPPER TEE

CROSS-REFERENCE TO RELATED APPLICATION

This application is a continuation-in-part of patent application Ser. No. 186,104 filed Apr. 25, 1988, now U.S. Pat. No. 4848,396 issued 07/18/89, which, in design patent application Ser. No. 817,584, filed Jan. 10, 1986, now U.S. Pat. No. Des. 297,678.

BACKGROUND OF THE INVENTION

This invention relates to molded hopper tees, and more particularly, to an integral one-piece molded hopper tee having generally transversely extending hollow pipe sections, each integrally molded from a rigid and durable polymer material, and having metal reinforcing elements molded in-situ within and adjacent outer free ends of the transversely extending hollow pipe sections.

It is well known that large hopper trucks or tank trailers are commonly used to transport bulk commodities, such as industrial and food products, from the supplier to the ultimate manufacturer, who converts the bulk commodity into products for consumers. The bulk commodity is pneumatically unloaded from the hopper truck or tank trailer into clean and sanitary pipe lines at the manufacturer's location. In order to provided the desired pneumatic unloading of the bulk commodity, a hopper tee is mounted to the discharge outlet of the hopper truck or tank trailer in order to transfer the bulk commodity, by gravity flow, air pressure and/or vibration into a generally vertically extending hollow pipe section of the hopper tee. The hopper tee also includes a transverse or horizontally extending hollow pipe section, connected to the generally vertically extending hollow pipe section, and allowing the outer ends of the generally horizontally extending hollow pipe section to be connected in the pneumatic pipeline tubing system of the manufacturer, for pneumatic unloading purposes As will be appreciated, pneumatic unloading of the bulk commodity, through at least the horizontal hollow pipe section and the pipe line tubing, is achieved by establishing a pressure differential in the manufacturer's pipeline system.

In the construction of prior art hopper tees, the generally vertically and horizontally extending hollow pipe sections have been welded together, as shown, for example, in the prior art drawing illustrations of my prior co-pending patent application Ser. No. 186,104, identified above. As was explained in this prior co-pending application, the welds in the area of juncture between the vertical and horizontal hollow pipe sections of the hopper tee produced rough and irregular internal wall surfaces, which not only substantially impeded product flow, but resulted in a much higher incident of product hang-up do to the rough and irregular internal wall surface areas. This resulted in product contamination. In addition, some abrasive dry bulk commodities, such as sand, cause premature wear-through of the hopper tee, particularly in the welded areas of juncture between the generally vertically and horizontally extending hollow pipe sections, and even through the entire hopper tee. As a result, most hopper tees, as well as the piping used for unloading, are typically made from schedule 80 type steel, in order to hold up to the abrasiveness of sand, or other similar materials.

In my aforementioned prior co-pending patent application Ser. No. 186,104, there is disclosed a cast hopper tee in which the area of juncture between the generally vertically and horizontally extending hollow pipe sections is provided with smooth and uninterrupted internal transitional services, permitting complete and continuous flow of product discharge from the hopper and into the generally vertically extending hollow pipe section in order to flow without impedance into the second generally horizontally extending hollow pipe section and then through the pipeline tubing. In addition to the aforementioned construction of the cast hopper tee, an inner molded lining from a polymer material having a low coefficient of friction may be used along the internal cylindrical walls including the smooth and uninterrupted internal transitional surfaces of the generally vertically and horizontally extending hollow pipe sections. In general, it was discovered that a urethane elastomeric lining not only provides a low coefficient of friction, but also has good abrasion resistance and good load bearing characteristics. When used with a cast aluminum hopper tee, the resulting product creates a lighter cast hopper tee having an inner molded polymer lining providing abrasion resistance equal to or better than the schedule 80 heavy steel, and yet resulted in a much lighter cast hopper tee, with greater pay load, which is extremely beneficial to users.

The present invention is a further extension and development of the various constructions employed in my prior co-pending application in that an entire one-piece molded polymer tee may be formed from a rigid and durable polymer material, together with additional reinforcing elements, to provide a hopper tee which is not only strong and durable in use in the intended environment, but which has a much lighter weight than all previously known prior art constructions, as well as those disclosed in my aforementioned co-pending patent applications.

SUMMARY OF THE INVENTION

Among the several objects and features of the present invention may be noted:

The provision of a molded hopper tee which provides an even and constant product flow throughout the generally vertically and horizontally directed hollow pipe sections of the hopper tee;

the provision of such molded hopper tee which eliminates problems associated with rough and irregular internal wall surfaces that may cause product contamination and/or wear-through when unloading abrasive dry bulk commodities, such as sand, for example;

the provision of such aforementioned molded hopper tee that is molded from a rigid, durable and abrasive-resistant polymer to provide a strong and durable hopper tee which is also much lighter than other prior art constructions, including my own prior developments;

the provision of such aforementioned molded hopper tee which can be manufactured either in a straight tee construction with generally vertically and horizontally directed hollow pipe sections, and also in a bottom drop version employing straight through gravity unloading at a desired location;

the provision of such aforementioned molded hopper tee which includes metal reinforcing elements adjacent the outer ends of the hollow pipe sections, including within a laterally outwardly directed flange at an upper end of the generally vertically directed hollow pipe section; and the provision of such aforementioned molded hopper tee which is much lighter than typically constructed hopper tees, is made from a material (i.e., urethane elastomer) which is FDA approved for food applications, is substantially more economical both in manufacture and/or use than prior art constructions; requires little or no maintenance; and is otherwise well adapted in the contemplated environment.

Briefly stated, a molded hopper tee of the present invention includes a first generally vertically directed hollow pipe section having a laterally outwardly directed flange at an upper end thereof for attachment to the bottom of hopper truck, its operating discharge valve, or the like. A second hollow pipe section extends generally transversely to the first hollow pipe section and is integrally attached thereto at a lower end thereof. The second hollow pipe section extends on opposite sides of the first hollow pipe section and terminates at opposite free ends for attachment to pipeline tubing. The integral first and second hollow pipe sections are integrally molded from a rigid and durable polymer material. The opposite free ends of the second hollow pipe section each have at least one circumferentially extending metal reinforcing element molded in-situ within and adjacent each free end of the second hollow pipe section. The laterally outwardly directed flange at the upper end of the first hollow pipe section also includes at least one metal reinforcing element molded in-situ so as to extend in the same direction as the laterally outwardly directed flange.

The molded hopper tee may be constructed as a straight tee with the generally vertically and horizontally extending hollow pipe sections as defined above, or may include a separate swing-away door mounted to the lower end of the first hollow pipe section so as to be capable of being swung out of the way enabling product to be discharged through the flow-through opening.

Each circumferentially extending metal reinforcing element at the opposite free ends of the second hollow pipe section includes a cylindrical member which extends generally centrally within each said free end for a predetermined length thereof. Each free end of the second hollow pipe section may also include an annular groove in the outer wall thereof which has a cross-sectional depth sufficient to expose part of an associated circumferentially extending metal reinforcing element. At least one reinforcing element in the laterally outwardly directed flange comprises at least one flat annular or washer-shaped member which extends for substantially the entire length of, but which terminates short of opposite inner and outer marginal areas of the laterally outwardly direct flange. The washer-shaped element also circumferentially supports the first hollow pipe section adjacent the upper end thereof. A pair of metal reinforcing rings may be provided adjacent an upper and lower surface of the laterally outwardly directed flange, and circumferentially spaced fastener openings may be provided in the laterally outwardly directed flange, including the at least one metal reinforcing element.

The first and second hollow pipe sections have internal cylindrical walls of predetermined diameter, and an area of juncture between the first and second hollow pipe sections includes smooth and uninterrupted internal transitional surfaces which provide complete and continuous flow of product through the first and second hollow pipe sections of the molded hopper tee. The molded hopper tee is preferably molded from an urethane elastomer polymer or other equivalent rigid, durable, and abrasion/resistant material.

The molded plastic tee is preferably injection molded and further includes insert molding of at least one cylindrically-shaped metal reinforcing element within and adjacent each free end of the second hollow pipe section and insert molding at least one flat washer-shape metal reinforcing element within and extending in the same direction as the laterally outwardly directed flange of the first hollow pipe section.

Other and further objects and features of this invention will become apparent from the description that is to follow.

BRIEF DESCRIPTION OF THE DRAWINGS

In the drawings.

Corresponding reference characters indicate corresponding part throughout the several figures in the drawings.

DESCRIPTION OF THE PREFERRED EMBODIMENT

Figure 1:
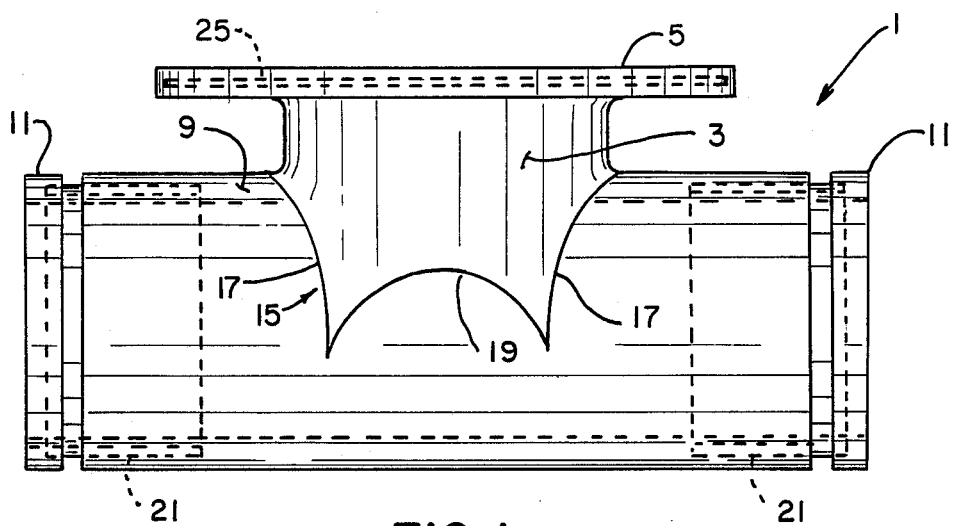
FIG. 1 is a side elevational view of the molded hopper tee which is constructed in accordance with the teachings of the present invention, and showing in dotted lines reinforcing elements at various locations thereof.

The molded hopper tee generally identified 1 in the various figures of the drawings is constructed for use in a hopper truck or tank tailer environment enabling bulk commodities to be discharged through the molded hopper tee 1 and then through pipeline tubing at a discharge location which is connected to the molded hopper tee 1, enabling pneumatic unloading therethrough.

In order to understand why the specific construction of the molded hopper tee 1 of the present invention enjoys advantageous features over other prior art hopper tees, including my own prior cast hopper tee developments, reference is made to my aforementioned prior co-pending patent application Ser. No. 186,104 filed Apr. 25, 1988. By referring to this prior co-pending application, the problems of the prior art which the present invention has overcome, as well as the different constructions proposed in my prior developments, will be fully understood. The present invention relates to hopper tees having a straight tee construction or bottom drop versions as shown in FIGS. 1-7 and 8-9 respectively of the above-identified application.

The molded hopper tee 1 of the present invention is materially different from the prior art, as well as my own prior developments, in that the molded hopper tee 1 is molded as a one-piece integral unit from a rigid, durable, and abrasive-resistant polymer, such as a urethane elastomer. In one of the embodiments in my prior development disclosed in the aforementioned co-pending patent application, a urethane elastomer lining is molded within and conforms to the inner cylindrical walls of the cast hopper tee construction. The molded hopper tee 1 of the present invention principally comprises the one-piece molded integral unit, and includes reinforcing elements at various locations thereof, as will be explained in detail below.

Reference is now made to FIGS. 1-8 of the drawings for a description of the construction of the integral one-piece molded hopper tee 1 of the present invention. The molded hopper tee 1 includes a first generally vertically directed hollow pipe section 3 having a laterally outwardly directed flange 5 at an upper end thereof for attachment to the bottom of a discharge valve, or directly to the hopper of a hopper truck or tank trailer, as may be desired. The generally vertically directed first hollow pipe section 3 includes an internal cylindrical wall 7 of predetermined internal diameter. The size of the internal cylindrical wall 7 of the first hollow pipe section 3 may be varied to suit the hopper size in the particular environment in which it is to be used.

A second hollow pipe section 9 extends generally transversely relative to the first hollow pipe section 3 and is integrally attached thereto at a lower end thereof. The second hollow pipe section 9 is generally horizontally directed and extends on opposite sides of the first hollow pipe section 3 and terminate at opposite free ends 11, 11 for attachment to pipeline tubing (not shown) at the discharge location, using any suitable attachment means as may be desired.

The general overall shape and construction of the molded hopper tee 1 is similar to both the prior art and my own developments, except that the area of juncture where the first and second hollow pipe sections 3, 9 are integrally joined together is similar to the construction shown in my aforementioned co-pending patent application Ser. No. 186,104 filed Apr. 25, 1988. As disclosed in my aforementioned prior co-pending Patent application, an area of juncture 15 between the first and second hollow pipe sections 3, 9, respectively, has smooth and uninterrupted internal transitional surfaces which permit complete and continuous flow of product discharged from a hopper truck or tank trailer into the first hollow pipe section 3, in order to allow product to flow along the internal cylindrical wall 7 thereof without impedance into the second hollow pipe section 9 for continuous and uninterrupted flow along the internal cylindrical wall 13 of the second hollow pipe section 9, for discharged into pipeline tubing (not shown) at the discharge location.

Figure 5:
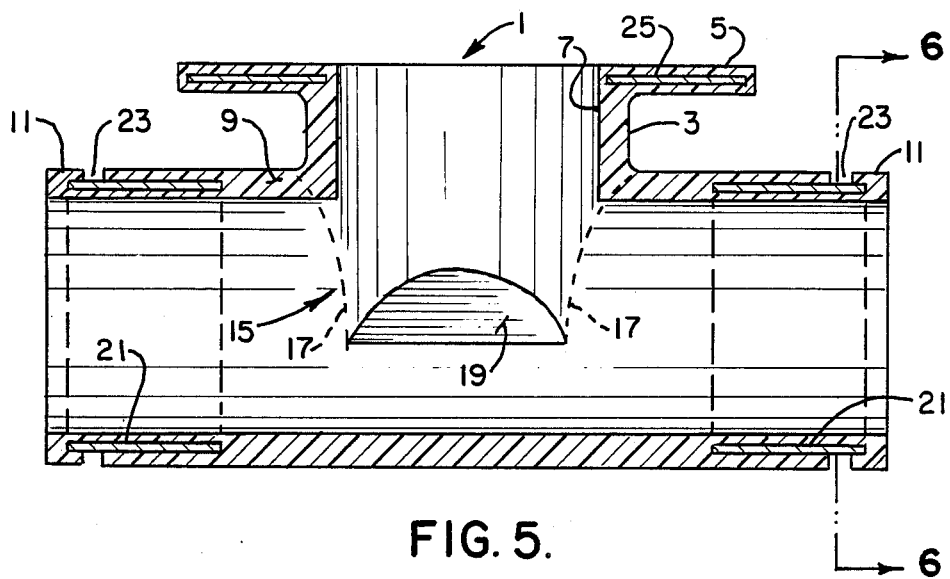
FIG. 5 is a side sectional view of this same molded hopper tee as viewed along lines 5—5 of FIG. 2.

As seen best in FIGS. 1 and 5 of the drawings, this area of juncture 15 between the first and second hollow pipe section 3, 9, respectively, includes first opposed internal curvilinear surfaces 17, 17 which extend along the internal cylindrical wall 13 of the second hollow pipe section 9 on both sides of an upper midpoint thereof; and second opposed internal curvilinear wall surfaces 19, 19, on opposite sides thereof, which extend generally along the second hollow pipe section 9 for a predetermined distance and merge with outermost portions of the first opposed internal curvilinear wall surfaces 17, 17, in order to provide the smooth and uninterrupted internal transitional surfaces for the molded hopper tee 1, in accordance with the teachings of my aforementioned prior co-pending patent application.

Figures 2, 3:
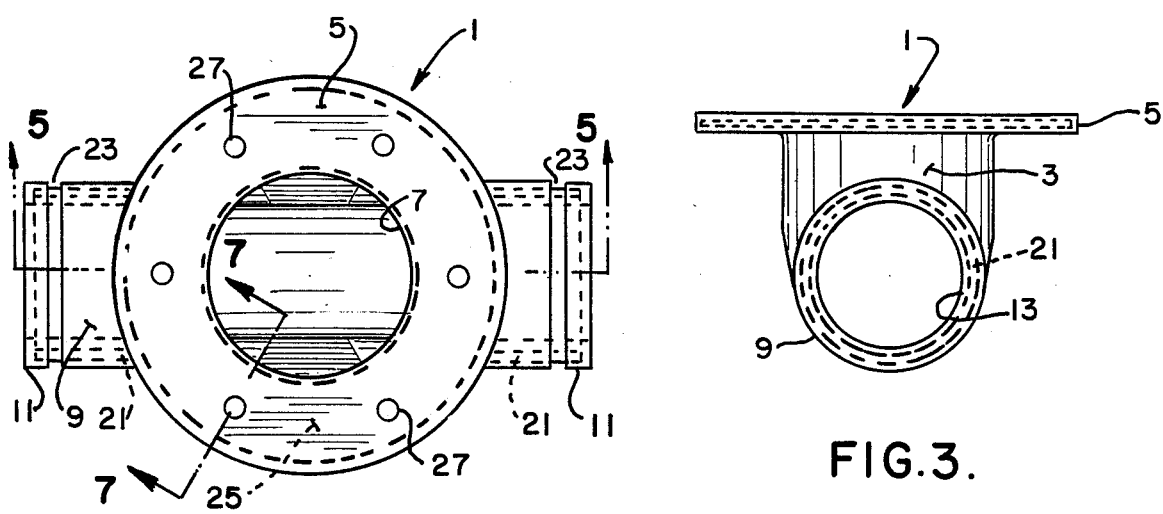
FIG. 2 is a top plan view of a molded hopper tee shown in FIG. 1.
FIG. 3 is an end elevational view of the aforementioned molded hopper tee.
Figure 4:
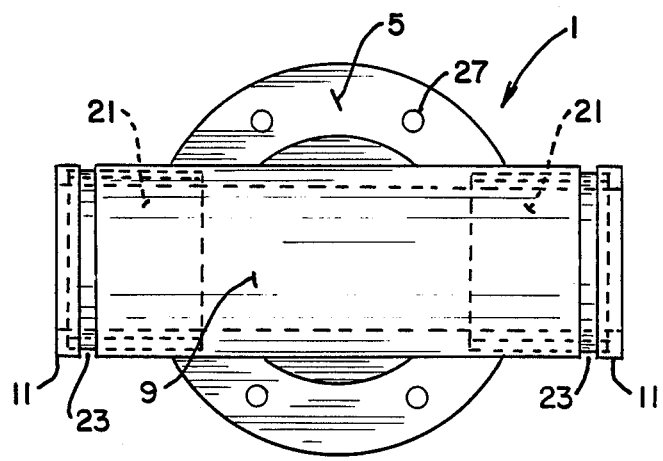
FIG. 4 is a bottom plan view of this same molded hopper tee.
Figure 6:
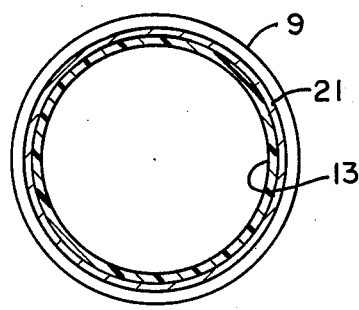
FIG. 6 is an end sectional view of the molded hopper tee as viewed along line 6—6 of FIG. 5.

Thus, as can be seen from the top plan view of the molded hopper tee 1 in FIG. 2 of the drawings and from the sectional views thereof as shown in FIGS. 5 and 6, as viewed along Lines 5—5 of the FIG. 2 and Line 6—6 of FIG. 5, smooth and uninterrupted internal transitional surfaces in the area of junction 15 between the first and second hollow pipe sections 3, 9, respectively, permit complete and continuous flow of product through the molded hopper tee 1.

According to the present invention, the molded hopper tee 1, including the integral first and second hollow pipe sections 3, 9, respectively, are integrally molded from a rigid, durable and abrasive-resistant polymer material such as a urethane elastomer. A molded hopper tee 1 made from a urethane elastomer provides not only a low coefficient of friction for bulk material products moved along the internal cylindrical walls 7, 13 of the first and second hollow pipe sections 3, 9, but also has good abrasion resistance and good load bearing characteristics. As disclosed in my aforementioned prior co-pending patent application, when a urethane elastomeric lining is used with a cast aluminum hopper tee, the resulting product is a lighter cast hopper tee having an inner molded lining that offers high abrasion resistance. It has been determined that such a product provides abrasion resistance equal to or better than schedule 80 heavy steel, which is typically used for sand hauling application, and yet the resulting product is a much lighter cast hopper tee than the prior art welded pipe sections.

According to the molded hopper tee 1 of the present invention, there is no cast hopper tee, but rather, the molded hopper tee 1 is injection molded or otherwise formed to the shape and construction illustrated in the drawings. In order to reinforce the molded hopper tee 1, metal reinforcing elements may be used at various locations thereof to strengthen and reinforce the same. Specifically, the opposite free ends 11, 11 of the second hollow pipe section 9 each have at least one circumferentially extending or cylindrically-shaped metal reinforcing element 21, 21 which is molded in-situ within and adjacent each free end 11, 11. It will be noted that the circumferentially extending or cylindrically-shaped element 21 at each end 11, 11 of the second hollow pipe section 1 is generally centrally located in the second hollow pipe section wall and extends for a predetermined length thereof. As is well known, a cylindrical element provides substantial hoop strength against collapse, and therefore, the location of the circumferentially extending or cylindrically-shaped element 21, 21 at the opposite free ends 11, 11 of the second hollow pipe section 9 affords stability and strength for the outer free ends 11, 11 of the second hollow pipe section 9, for proper interfitting connection to pipe line tubing at a discharge location.

It will be noted that an annular groove 23, 23 is provided in an outer wall of the second hollow pipe section 9 which has a cross-sectional depth sufficient to expose part of an associated circumferentially extending or cylindrically-shaped metal reinforcing element 21, 21 at each free end 11, 11 of the second hollow pipe section 9, similar to the cast hopper tee in my aforementioned prior co-pending patent application. This provides spaced outer sealing surfaces adjacent the free end 11, 11 of the second hollow pipe section 9, facilitating the securement of pipeline tubing at discharge location thereto.

The molded hopper tee 1 also includes at least one reinforcing element in the laterally outwardly direct flange 5 at the upper free end of the generally vertically extending first hollow pipe section 3. As shown in the drawings, this reinforcing element comprises at least one flat washer-shaped member 25 which extends for substantially the entire length of the laterally outwardly directed flange 5, but which terminates short of opposite inner and outer marginal areas thereof. As seen in FIG. 5 of the drawing, the flat washer-shaped element 25 terminates short of the inner marginal area of the laterally outwardly directed flange 5, but also circumferentially supports the first hollow pipe section 3 adjacent the open upper end thereof. As a result, the open upper end of the first hollow pipe section 3 is maintained in a cylindrical-shape conforming to the inner cylindrical wall 7.

In addition, the flat washer-shaped element 25 includes a series of circumferentially spaced fastener openings 27 therein which conform to complementary openings in the laterally outwardly directed flange 5 of the molded hopper tee 1 for receiving fasteners to bolt the molded hopper tee 1 to a valve or directly to a hopper, as may be desired.

Figure 7:
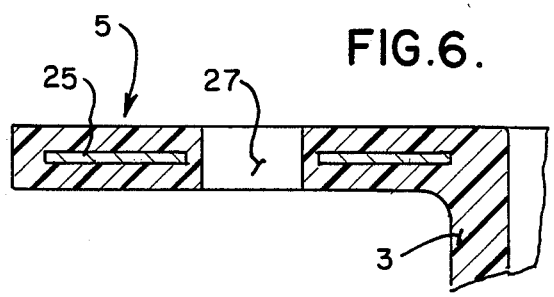
FIG. 7 is an enlarged fragmentary sectional view of the laterally outwardly directed flange associated with the vertically extending hollow pipe section as viewed along line 7—7 of FIG. 2.
Figure 8:
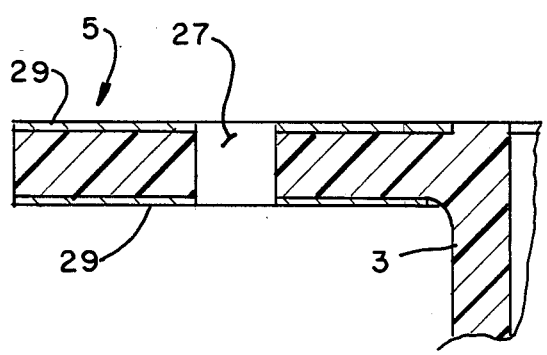
FIG. 8 is an enlarged fragmentary sectional view of a modified form of laterally outwardly directed flange with metal reinforcing elements adjacent to outer surfaces thereof.

Referring to FIGS. 7-8 of the drawings, several variations of the reinforcing elements associated with the laterally outwardly directed flange 5 are shown. In FIG. 7 of the drawings, the annular or flat-washer shaped member 25 corresponds to FIGS. 1-6 of the drawings wherein the washer-shaped member 25 is positioned generally centrally within the laterally outwardly directed flange 5 and extends for substantially the entire length of, but terminates short of opposite inner and outer marginal areas of the laterally outwardly directed flange 5. In FIG. 8 of the drawings, a pair of metal reinforcing rings or annuluses 29, 29 are provided on outer surfaces of the laterally outwardly directed flange 5 in order to prevent bold heads and/or complementary nuts from sinking into the urethane elastomer formed generally outwardly directed flange 5. Similarly, the openings 27 of the laterally outwardly directed flange 5 are aligned with inner circumferential marginal edges of the spaced metal reinforcing rings 29, 29 to prevent the threaded bolt shanks or the like from sinking into the urethane elastomer formed laterally outwardly directed flange 5, in the area of the fastener openings 27. Other and further modifications of the FIG. 7 and 8 embodiments may be provided in order to both reinforce the laterally outwardly directed flange 5, without unnecessary deformation thereof.

From the foregoing, it will now be appreciated that the molded hopper tee of the present invention provides an extremely light weight hopper tee construction, while also providing reinforcement in the area of outer free ends thereof or along flanges for connecting the hopper tee to a hopper truck, tank trailer, or the like. The molded hopper tee is constructed from a rigid, durable and abrasive-resistant material as an integrally molded unit having a generally vertically extending first hollow pipe section and a generally transversely or horizontally extending second hollow pipe section. Even and constant product flow throughout the generally vertically and horizontally directed pipe sections is provided through uninterrupted internal transitional surfaces between the first and second hollow pipe sections, in order to permit complete and continuous flow of product discharge from a hopper truck or the like to and through the molded hopper tee without flow impedance. The molded hopper tee includes generally circumferentially extending or cylindrically-shaped metal reinforcing elements at opposite free ends thereof and at least one reinforcement element in the laterally outwardly directed flange at the upper end of the first hollow pipe section, in order to provide strength, reinforcement and stability maintaining the shape and construction of these reinforced areas. Thus, the internal cylindrical walls of the first and second hollow pipe sections are maintained in the shape and construction as originally formed, even during repeated and continued use of the molded hopper tee.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. A molded hopper tee including, a first generally vertically directed hollow pipe section having a laterally outwardly directed flange at an upper end thereof for attachment to the bottom of a hopper or the like, a second hollow pipe section extending generally transversely to said first hollow pipe section and being integrally attached to said first hollow pipe section at a lower end thereof, said second hollow pipe section extending on opposite sides beyond the first hollow pipe section and terminating at opposite free ends for attachment to pipeline tubing or the like, said integral first and second hollow pipe sections being integrally molded from a rigid and durable polymer material, the opposite free ends of said second hollow pipe section each having at least one circumferentially extending metal reinforcing element connected adjacent each said free end, the laterally outwardly directed flange at an upper end of said first hollow pipe section also including at least one metal reinforcing element connected thereto so as to extend in the same direction as said laterally outwardly directed flange, at least one reinforcing element int he laterally outwardly directed flange comprises at least one flat washer-shaped member which extends for substantially the entire length of, but which terminates short of, opposite inner and outer marginal areas of said laterally outwardly directed flange, said at least one washer-shaped element circumferentially supporting said first hollow pipe section adjacent the upper end thereof, and a pair of metal reinforcing rings adjacent and upper and lower surface of said laterally outwardly directed flange.

2. A molded hopper tee including, a first generally vertically directed hollow pipe section having a laterally outwardly directed flange at an upper end thereof for attachment to the bottom of a hopper or the like, a second hollow pipe section extending generally transversely to said first hollow pipe section, and being integrally attached to said first hollow pipe section at a lower end thereof, said second hollow pipe section extending on opposite sides beyond the first hollow pipe section and terminating at opposite free ends for attachment to pipeline tubing or the like, said integral first and second hollow pipe sections being integrally molded from a rigid and durable polymer material, the opposite free ends of said second hollow pipe section each having at least one circumferentially extending metal reinforcing element connected adjacent each said free end, the laterally outwardly directed flange at an upper end of said first hollow pipe section also including at least one flat washer-shaped metal reinforcing ring molded in-situ and embedded within said flange and extending in the same direction as said laterally outwardly directed flange, each circumferentially extending metal reinforcing element at the free end of said second hollow pipe section comprising a cylindrical member which extends generally centrally and embedded within each of said free ends for a predetermined length thereof, and each of said free ends of said second hollow pipe section including an annular groove formed therein within an outer wall and which has a cross-sectional depth sufficient to expose at least a part of said circumferentially extending metal reinforcing element at least on its outer surface thereof, each of said metal reinforcing elements being cylindrically-shaped and extending axially aligned within said opposite free ends of the said second hollow pipe section.

3. A molded hopper tee as defined in claim 2 wherein said first hollow pipe section extends through said second hollow pipe section and has a flow-through opening at a lower end thereof and a separate swing-away door mounted to the lower end of the first hollow pipe section so as to be capable of being swung out of the way enabling product to be discharged through said flow-through opening.

4. The molded hopper tee as defined in claim 2 wherein said first and second hollow pipe sections have internal cylindrical walls of predetermined diameter; and an area of juncture between said first and second hollow pipe sections having smooth and uninterrupted internal transitional surfaces which provide complete and continuous flow of product through the first and second hollow pipe sections.

5. The molded hopper tee as defined in claim 2 wherein said molded polymer material is a urethane elastomer.

* * * * *